(12) United States Patent
Naser et al.

(10) Patent No.: US 12,155,824 B2
(45) Date of Patent: Nov. 26, 2024

(54) SIGNALING CHROMA OFFSET PRESENCE IN VIDEO CODING

(71) Applicant: INTERDIGITAL CE PATENT HOLDINGS, SAS, Paris (FR)

(72) Inventors: Karam Naser, Mouazé (FR); Fabrice Leleannec, Betton (FR); Tangi Poirier, Thorigné-Fouillard (FR); Franck Galpin, Thorigne-Fouillard (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 110 days.

(21) Appl. No.: 17/912,314

(22) PCT Filed: Feb. 23, 2021

(86) PCT No.: PCT/EP2021/054456
§ 371 (c)(1),
(2) Date: Sep. 16, 2022

(87) PCT Pub. No.: WO2021/185540
PCT Pub. Date: Sep. 23, 2021

(65) Prior Publication Data
US 2023/0164311 A1    May 25, 2023

(30) Foreign Application Priority Data

Mar. 16, 2020 (EP) ..................................... 20305269
Apr. 2, 2020 (EP) ..................................... 20315099

(51) Int. Cl.
H04N 19/117 (2014.01)
H04N 19/176 (2014.01)
(Continued)

(52) U.S. Cl.
CPC ......... *H04N 19/117* (2014.11); *H04N 19/176* (2014.11); *H04N 19/186* (2014.11); *H04N 19/82* (2014.11)

(58) Field of Classification Search
CPC .. H04N 19/117; H04N 19/172; H04N 19/176; H04N 19/179; H04N 19/186;
(Continued)

(56) References Cited

U.S. PATENT DOCUMENTS

2007/0009048 A1* 1/2007 Rodriguez ........... H04N 19/186
375/E7.199
2013/0266074 A1* 10/2013 Guo ....................... H04N 19/96
375/240.24
(Continued)

FOREIGN PATENT DOCUMENTS

WO    WO 2020216176 A1    10/2020

OTHER PUBLICATIONS

Boyce, Jill, "Report of BoG on high level tool control and feature combinations", Joint Video Experts Team (JVET) of ITU-T SG 16 WP3 and ISO/IEC JTC 1/SC 29/WG 11, Document: JVET-Q0625-v1, 17th Meeting, Brussels, Belgium, Jan. 7, 2020, 13 pages.
(Continued)

*Primary Examiner* — Md N Haque
(74) *Attorney, Agent, or Firm* — Condo Roccia Koptiw LLP

(57) ABSTRACT

A video coding system handling at least a block of at least an image of a video comprises an encoding process and decoding process respectively providing or using signaling information related to the video, wherein the signaling information comprises at least an information representative of the presence of chroma offset values, wherein when chroma is present and does not use separate color planes, the information representative of the presence of chroma offset
(Continued)

values is set and the signaling information further comprises information representative of a chroma offsets values and wherein when chroma is not present or uses separate color planes, the information representative of the presence of chroma offset values is reset and no information representative of a chroma offsets values is further signaled.

19 Claims, 6 Drawing Sheets

(51) Int. Cl.
*H04N 19/186* (2014.01)
*H04N 19/82* (2014.01)

(58) Field of Classification Search
CPC ...... H04N 19/196; H04N 19/46; H04N 19/70; H04N 19/82; H04N 19/98
See application file for complete search history.

(56) References Cited

U.S. PATENT DOCUMENTS

2013/0272431 A1* 10/2013 Baird ............ H04N 21/440272
  375/240.26
2017/0318293 A1* 11/2017 Chono ................ H04N 19/136
2018/0278958 A1*  9/2018 Hsiang .................. H04N 19/60
2021/0368172 A1* 11/2021 Lim ....................... H04N 19/96

OTHER PUBLICATIONS

Bross et al., "Versatile Video Coding (Draft 8)", Joint Video Experts Team (JVET) of ITU-T SG 16 WP3 and ISO/IEC JTC 1/SC 29/WG 11, Document: JVET-Q2001-vD, 17th Meeting, Brussels, Belgium, Jan. 7, 2020, 511 pages.

Anonymous, "High Efficiency Video Coding", International Telecommunication Union, Telecommunication Standardization Sector of ITU, Series H: Audiovisual and Multimedia Systems—Infrastructure of audiovisual services—Coding of moving video, Recommendation of ITU-T H.265, Nov. 2019, 712 pages.

* cited by examiner

SIGNALING CHROMA OFFSET PRESENCE IN VIDEO CODING

CROSS REFERENCE TO RELATED APPLICATIONS

This application is a U.S. National Stage Application under 35 U.S.C. 371 of International Patent Application No. PCT/EP2021/054456, filed Feb. 23, 2021, which is incorporated herein by reference in its entirety.

This application claims the benefit of European Application Nos. 20305269.1, filed Mar. 16, 2020; and 20315099.0 filed Apr. 2, 2020.

TECHNICAL FIELD

At least one of the present embodiments generally relates to signaling syntax for video coding and decoding and more particularly to chroma offset values.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments provides a video coding system handling at least a block of at least an image of a video comprising an encoding process and decoding process respectively implemented on an encoding apparatus and a decoding apparatus, respectively providing or using signaling information related to the video, wherein the signaling information comprises at least an information representative of the presence of chroma offset values, wherein when chroma is present and does not use separate color planes, the information representative of the presence of chroma offset values is set and the signaling information further comprises information representative of a chroma offsets values and wherein when chroma is not present or uses separate color planes, the information representative of the presence of chroma offset values is reset and no information representative of a chroma offsets values is further signaled.

According to a first aspect of at least one embodiment, a video encoding method comprises, for at least one block of at least one image of a video, encoding the at least one block and corresponding signaling information comprising at least an information representative of the presence of chroma offset values, wherein when chroma is present and does not use separate color planes, the information representative of the presence of chroma offset values is set and the signaling information further comprises information representative of a chroma offsets values and wherein when chroma is not present or uses separate color planes, the information representative of the presence of chroma offset values is reset and no information representative of a chroma offsets values is further signaled.

According to a second aspect of at least one embodiment, a video decoding method comprises, for at least one block of at least one image of a video, obtaining signaling information comprising at least an information representative of the presence of chroma offset values, in the condition that the information representative of the presence of chroma offset values is set, obtaining information representative of a chroma offsets values from the signaling information, and decoding the at least one block based on the obtained signaling information.

According to a third aspect of at least one embodiment, an apparatus, comprises an encoder for encoding picture data for at least one block in a picture or video wherein the encoder is configured to encode the at least one block and corresponding signaling information comprising at least an information representative of the presence of chroma offset values, wherein when chroma is present and does not use separate color planes, the information representative of the presence of chroma offset values is set and the signaling information further comprises information representative of a chroma offsets values and wherein when chroma is not present or uses separate color planes, the information representative of the presence of chroma offset values is reset and no information representative of a chroma offsets values is further signaled.

According to a fourth aspect of at least one embodiment, an apparatus, comprises a decoder for decoding picture data for at least one block in a picture or video wherein the decoder is configured to obtain signaling information comprising at least an information representative of the presence of chroma offset values, in the condition that the information representative of the presence of chroma offset values is set, obtaining information representative of a chroma offsets values from the signaling information, and decoding the at least one block based on the obtained signaling information.

According to a fifth aspect of at least one embodiment, a bitstream comprises at least one block and corresponding signaling information comprising at least an information representative of the presence of chroma offset values, wherein when chroma is present and does not use separate color planes, the information representative of the presence of chroma offset values is set and the signaling information further comprises information representative of a chroma offsets values and wherein when chroma is not present or uses separate color planes, the information representative of the presence of chroma offset values is reset and no information representative of a chroma offsets values is further signaled.

According to a sixth aspect of at least one embodiment, a computer program comprising program code instructions executable by a processor is presented, the computer program implementing the steps of a method according to at least the first or second aspect.

According to a seventh aspect of at least one embodiment, a computer program product which is stored on a non-transitory computer readable medium and comprises program code instructions executable by a processor is presented, the computer program product implementing the steps of a method according to at least the first or second aspect.

DETAILED DESCRIPTION

Figure 1:
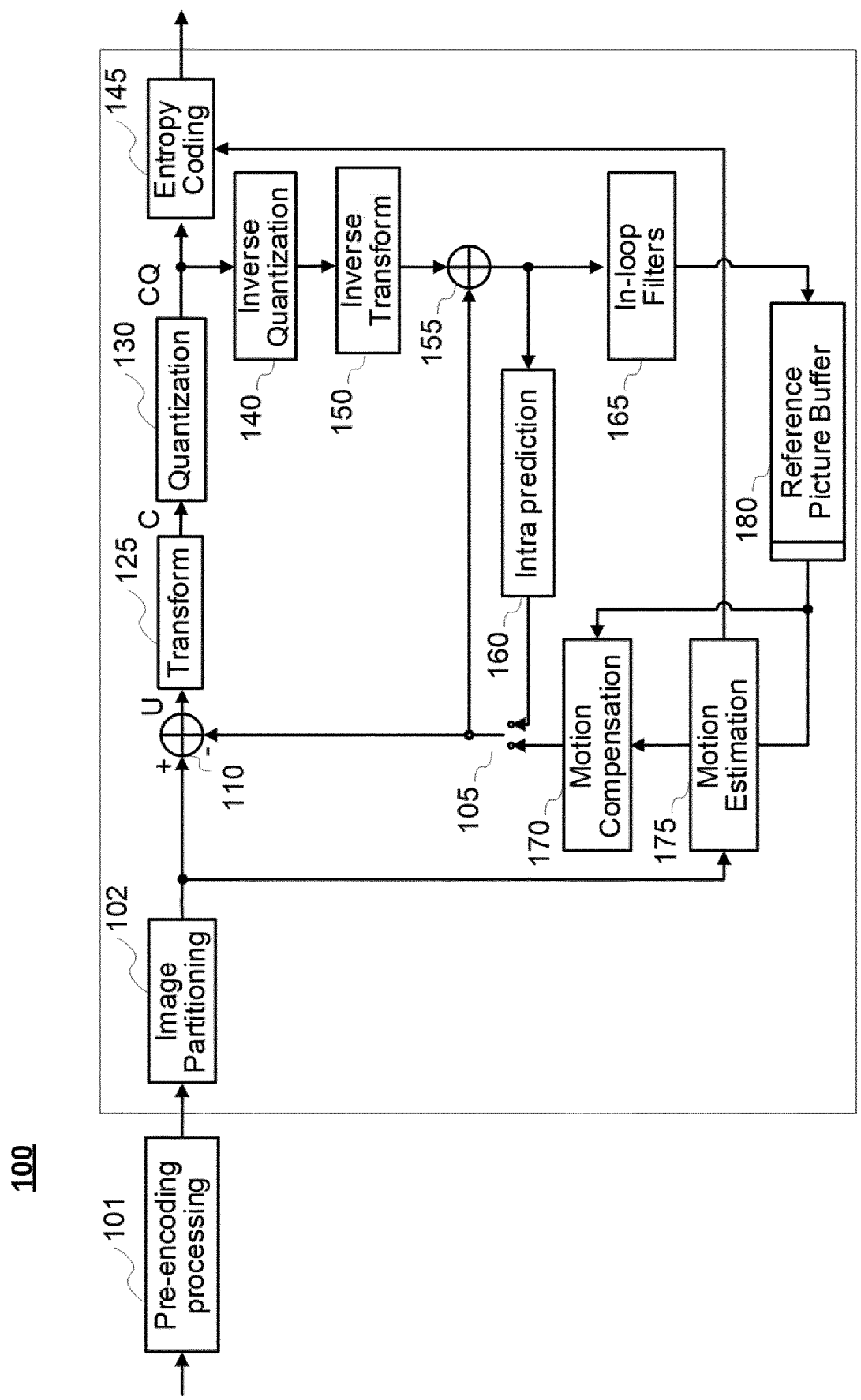
FIG. 1 illustrates a block diagram of an example of video encoder 100.

FIG. 1 illustrates block diagram of an example of video encoder 100. Examples of video encoders comprise a High Efficiency Video Coding (HEVC) encoder compliant with the HEVC standard, or a HEVC encoder in which improvements are made to the HEVC standard or an encoder employing technologies similar to HEVC, such as a JEM (Joint Exploration Model) encoder under development by JVET (Joint Video Exploration Team) for the VVC (Versatile Video Coding) standard, or other encoders.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

Figure 2:
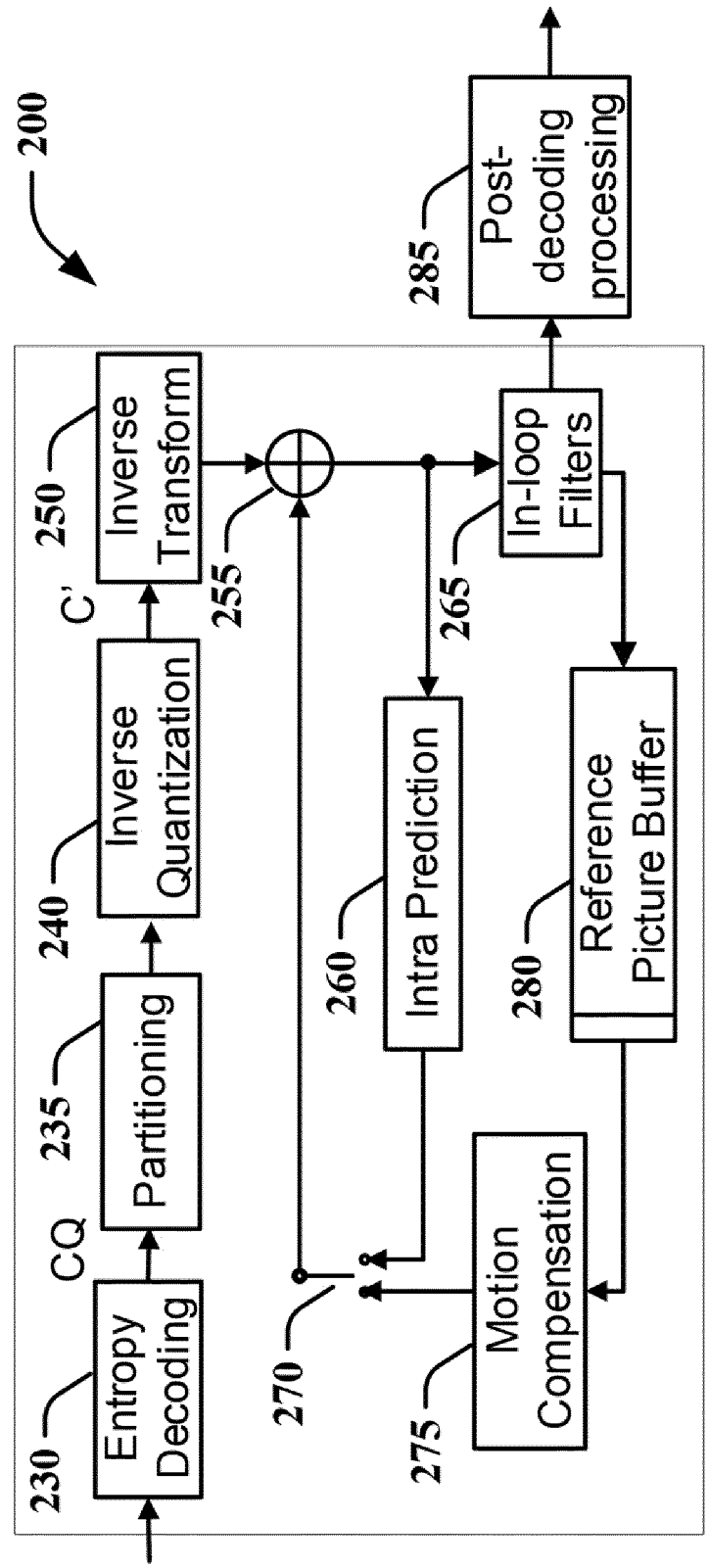
FIG. 2 illustrates a block diagram of an example of video decoder 200.

FIG. 2 illustrates a block diagram of an example of video decoder 200. Examples of video decoders comprise a High Efficiency Video Coding (HEVC) decoder compliant with the HEVC standard, or a HEVC decoder in which improvements are made to the HEVC standard or a decoder employing technologies similar to HEVC, such as a JEM (Joint Exploration Model) decoder under development by JVET (Joint Video Exploration Team) for the VVC (Versatile Video Coding) standard, or other decoders.

In the example of decoder 200, a bitstream is decoded by the decoder elements as described below. Video decoder 200 generally performs a decoding pass reciprocal to the encoding pass as described in FIG. 1, which performs video decoding as part of encoding video data. The encoder 100 also generally performs video decoding as part of encoding video data.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
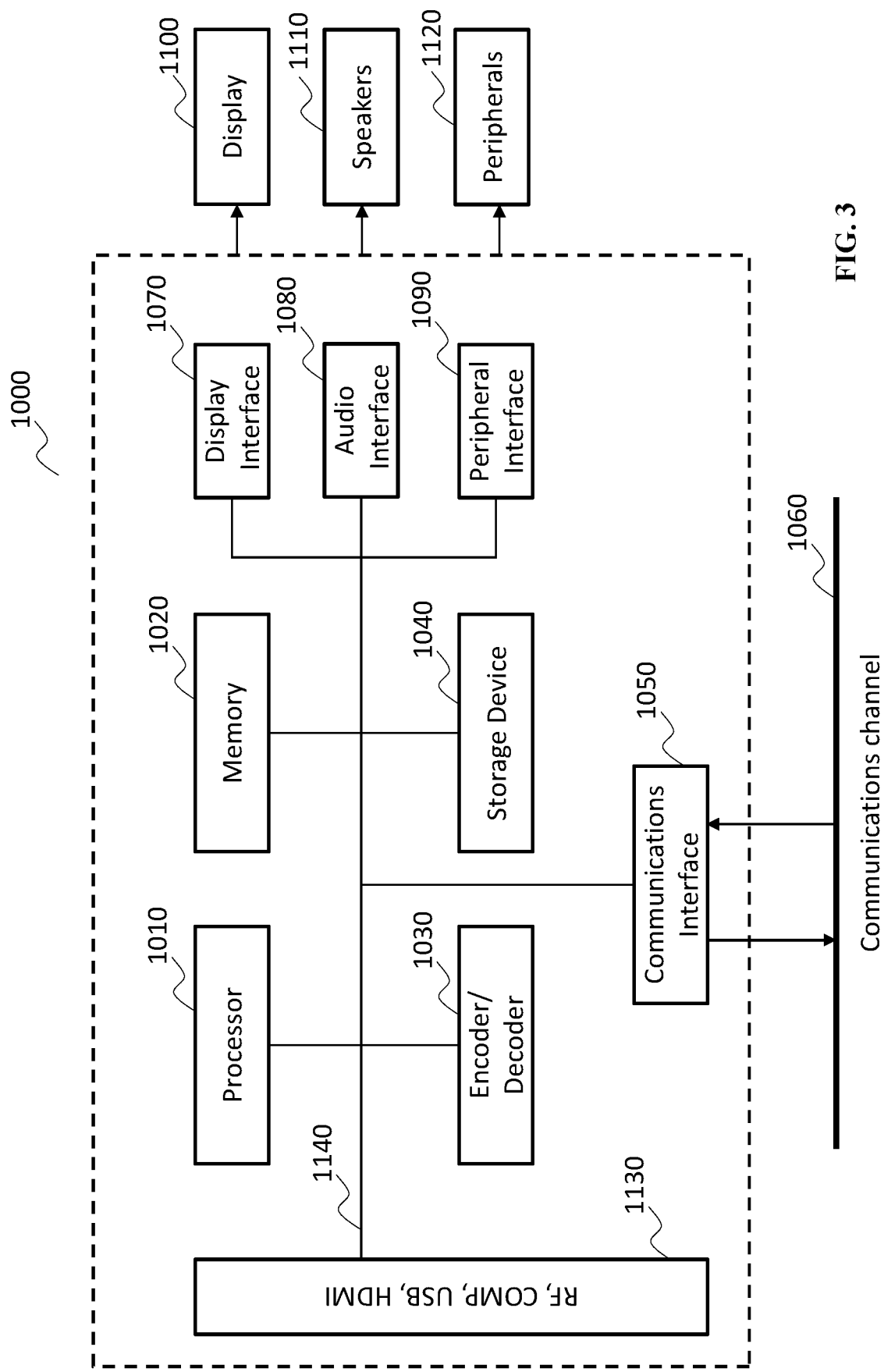
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the data stream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

As introduced above, deblocking filter are In-loop filters (165) that are applied to the reconstructed picture to reduce encoding artifacts. These filters require parameters. The following syntax elements are described in the example of video coding system as specified by VVC draft 8. However, other video coding systems or other versions of VVC may use similar mechanisms for signaling and using deblocking filters. In such example, the deblocking parameters may be coded either in Picture Parameters Set (PPS), in slice header (SH) or in picture header (PH). This is controlled by a PPS flag named deblocking_filter_override_enabled_flag. If this flag equals to one, the parameters are coded in either in PH or SH, otherwise they are coded in PPS. This is illustrated by the table 1.

TABLE 1

| pic_parameter_set_rbsp( ) { | Descriptor |
|---|---|
| ... | |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| ... | |
| if( deblocking_filter_override_enabled_flag ) | |
|   dbf_info_in_ph_flag | u(1) |

The semantic of the flags is as follows:

deblocking_filter_override_enabled_flag equal to 1 specifies the presence of ph_deblocking_filter_override_flag in the PHs referring to the PPS or slice_deblocking_filter_override_flag in the slice headers referring to the PPS.

deblocking_filter_override_enabled_flag equal to 0 specifies the absence of ph_deblocking_filter_override_flag in PHs referring to the PPS or slice_deblocking_filter_override_flag in slice headers referring to the PPS.

when not present, the value of deblocking_filter_override_enabled_flag is inferred to be equal to 0.

If override is allowed, dbf_info_in_ph_flag specifies whether the parameters are coded in PH or SH. More particularly:

dbf_info_in_ph_flag equal to 1 specifies that deblocking filter information is present in the PH syntax structure and not present in slice headers referring to the PPS that do not contain a PH syntax structure.

dbf_info_in_ph_flag equal to 0 specifies that deblocking filter information is not present in the PH syntax structure and may be present in slice headers referring to the PPS that do not contain a PH syntax structure.

when not present, the value of dbf_info_in_ph_flag is inferred to be equal to 0.

In the picture header, the parameters are coded as illustrated in table 2.

TABLE 2

| picture_header_structure( ) { | Descriptor |
|---|---|
| ... | |
| if( deblocking_filter_override_enabled_flag && dbf_info_in_ph_flag ) { | |
|   ph_deblocking_filter_override_flag | u(1) |
|   if( ph_deblocking_filter_override_flag ) { | |

TABLE 2-continued

| picture_header_structure( ) { | Descriptor |
|---|---|
|   ph_deblocking_filter_disabled_flag | u(1) |
|   if( !ph_deblocking_filter_disabled_flag ) { | |
|     ph_beta_offset_div2 | se(v) |
|     ph_tc_offset_div2 | se(v) |
|     ph_cb_beta_offset_div2 | se(v) |
|     ph_cb_tc_offset_div2 | se(v) |
|     ph_cr_beta_offset_div2 | se(v) |
|     ph_cr_tc_offset_div2 | se(v) |
|     } | |
|   } | |
| } | |
| ... | |

In the slice header, the parameters are coded as illustrated in Table 3.

TABLE 3

| slice_header( ) { | Descriptor |
|---|---|
|   ... | |
|   if( deblocking_filter_override_enabled_flag && !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } | |
|   } | |
| ... | |

At all of the three levels (PPS, PH and HS), the deblocking parameters coded may be beta_offset_div2, tc_offset_div2, cb_beta_offset_div2, cb_tc_offset_div2, cr_beta_offset_div2, and cr_tc_offset_div2. They represent the beta and tc offsets used for deblocking and may be coded for luma and chroma (cb and cr) components. Unlike many other syntaxes in video coding systems, the chroma parameters may be coded regardless of the chroma format.

Specifically, the chroma format of yuv400 is a format where only luma components exist. That is, all chroma related syntax and code are not used.

Similarly, there exists a coding mode where separable coding of color components called yuv444. In this case, the chroma components are treated as independent luma component. The configuration corresponds to the SPS flag separate_colour_plane_flag that is coded as illustrated in table 4.

TABLE 4

| seq_parameter_set_rbsp( ) { | Descriptor |
|---|---|
|   ... | |
|   chroma_format_idc | u(2) |
|   if( chroma_format_idc = = 3 ) | |
|     separate_colour_plane_flag | u(1) |
|   ... | |

In this table, a chroma_format_idc value equal to 3 indicates a chroma format of 444.

Thus, there are two configurations where no chroma related syntax shall be used. A variable named ChromaArrayType may be used to distinguish this case and may be computed as follows. When separate_colour_plane_flag is equal to 0, ChromaArrayType is set equal to chroma_format_idc, otherwise, ChromaArrayType is set equal to 0. As a result, if ChromaArrayType equals to zero, no chroma related syntax shall be used.

However, the deblocking filter parameters related to chroma are coded regardless of the value of ChromaArrayType. That is, even if chroma is not used, the following four syntax element are coded: cb_beta_offset_div2, cb_tc_offset_div2, cr_beta_offset_div2 and cr_tc_offset_div2. Therefore, such signaling is redundant and costs some bits that are never used. Moreover, it makes it more complicated for the encoder designer to set irrelevant values.

Embodiments described hereafter have been designed with the foregoing in mind.

In at least one embodiment, a video coding system handling at least a block of at least an image of a video comprises an encoding process and decoding process respectively providing or using signaling information related to the video, wherein the signaling information comprises deblocking filter parameters for chrominance when the information representative of the presence of deblocking filter information is true and the information representative of the disabling of the deblocking filter is false and the information representative of chrominance type is true. In other words, the presence of the deblocking filter parameters for the chrominance is subject to testing of a set of syntax elements. This allows to improve the coding efficiency by reducing the overall size of the required information since these parameters are present in the bitstream only when needed.

Figure 4A:
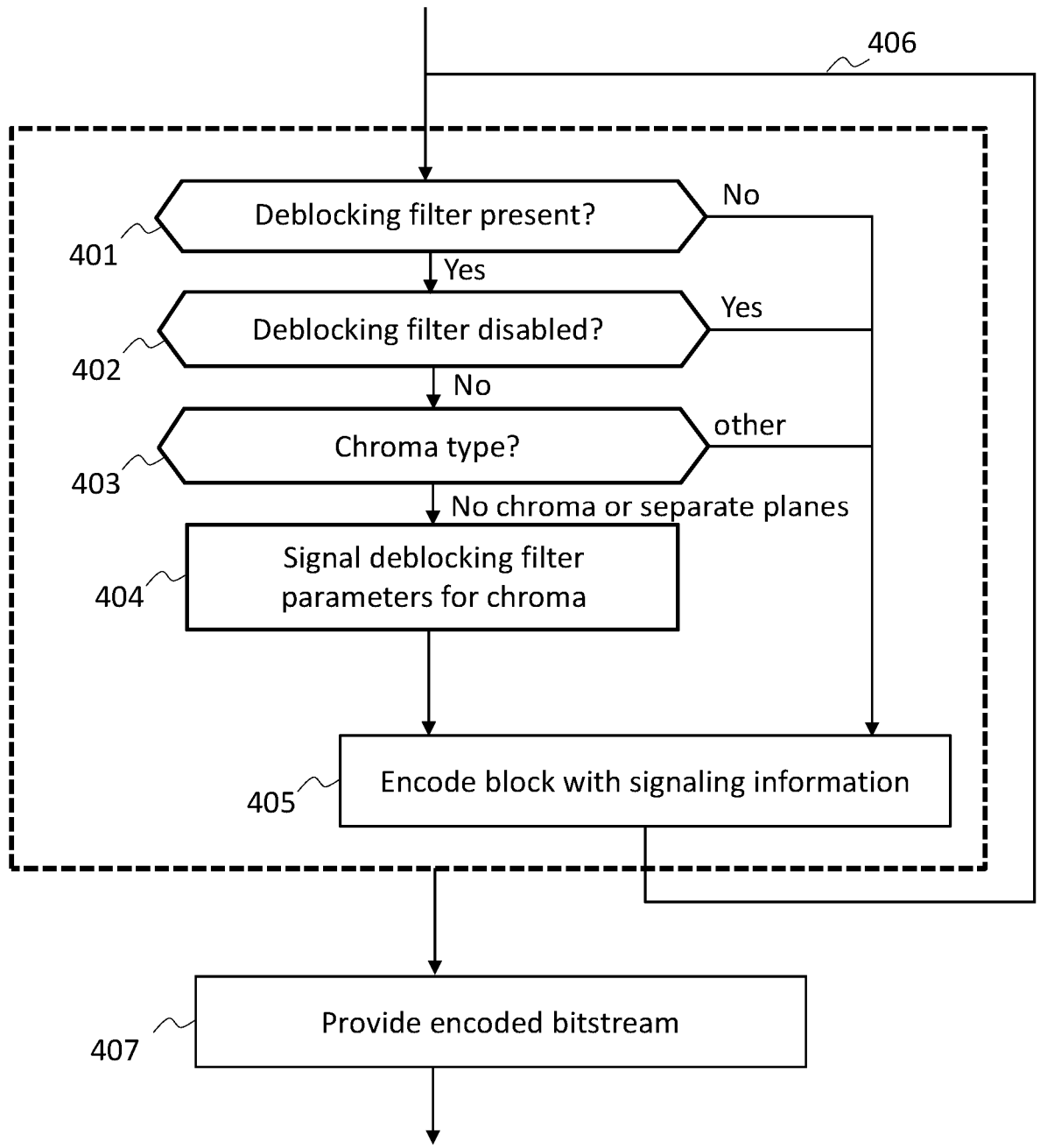
FIG. 4A illustrates an example of flowchart for encoding according to an example embodiment.

FIG. 4A illustrates an example of flowchart for the encoding process according to an example embodiment. Such process is for example implemented in the video encoder 100 described above. In this process, in step 401, the encoder checks the flag indicating that the deblocking filter control parameters are present. If it is the case, in branch "Yes", the encoder checks, in step 402, the flag indicating that the deblocking filter is disabled. If it is not the case, in branch "No", the encoder checks, in step 403, the chroma type. This test corresponds to determining whether yuv400 or yuv444 are used, in other words, respectively, if only luma components are used (no chroma) or if luminance and chrominance are coded separately in different planes. If it is the case, in branch "No chroma or separate planes", the encoder signals, in step 404, the deblocking filter parameters to be applied to the chrominance samples. In other words, the deblocking filter parameters are added to the signaling information to be encoded. In all other cases (branch "no" of step 401 or 403, branch "Yes" of step 402), no deblocking filter parameters for the chrominance will be signaled. Finally, in step 405, the block is encoded with the signaling information. The process iterates over other blocks in step 406 until providing the encoded bitstream in step 407. The person skilled in the art will acknowledge that the whole encoding process comprises other steps not represented here since not related to the embodiment.

Figure 4B:
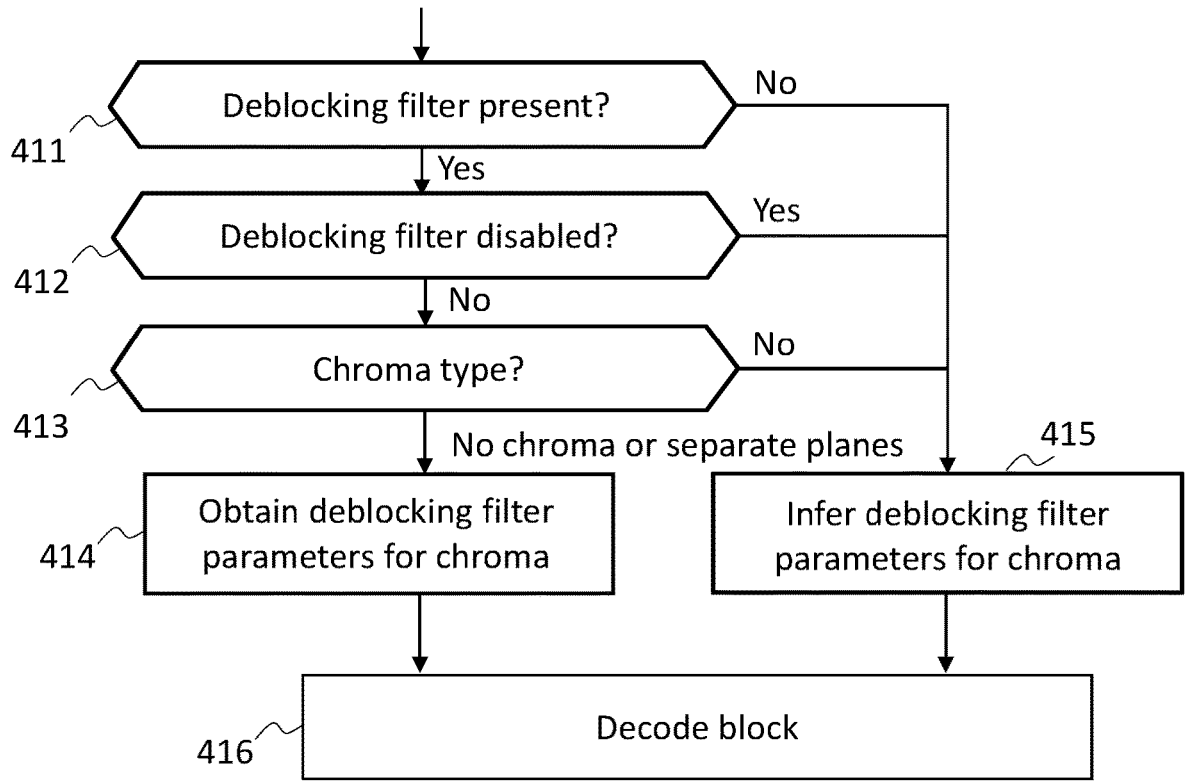
FIG. 4B illustrates an example of flowchart for decoding according to an example embodiment.

FIG. 4B illustrates an example of flowchart for the decoding process according to an example embodiment. Such process is for example implemented in the video decoder 200 but also in the video encoder 100, both devices being described above. The process is described with regards to the decoder. In this process, in step 411, the decoder checks the flag indicating that the deblocking filter control parameters are present. If it is the case, in branch "Yes", the decoder checks, in step 412, the flag indicating that the deblocking filter is disabled. If it is not the case, in branch "No", the decoder checks, in step 413, the chroma type. Similarly than for the encoding process, this test corresponds to determining whether yuv400 or yuv444 are used, in other words, respectively, if only luma components are used (no chroma) or if luminance and chrominance are coded separately in different planes. If it is the case, in branch "No chroma or separate planes", the decoder obtains, in step 414, the deblocking filter parameters to be applied to the chrominance samples. In all other cases (branch "no" of step 411 or 413, branch "Yes" of step 412), no deblocking filter parameters for the chrominance is signaled and therefore appropriate deblocking filter parameters are inferred in step 415. Finally, in step 405, the block is decoded and deblocking filter is applied with the obtained or inferred parameters. The person skilled in the art will acknowledge that the whole encoding process comprises other steps not represented here since not related to the embodiment.

The process of FIGS. 4A and 4B allow to solve the redundancy problem since the coding of chroma deblocking parameters is conditioned by the chroma format. In an example implementation using the syntax of VVC draft 8, this may be done by testing the value of the ChromaArrayType syntax element. When ChromaArrayType is zero, the following parameters should not be coded either at PPS, PH or SH level: beta_offset_div2, tc_offset_div2, cb_beta_offset_div2, cb_tc_offset_div2, cr_beta_offset_div2 and cr_tc_offset_div2.

Table 5 shows an example embodiment according to an implementation applied to the VVC syntax where the ChromaArrayType syntax element is tested at the picture parameter set level.

TABLE 5

| pic_parameter_set_rbsp( ) { | Descriptor |
|---|---|
| ... | |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| if (ChromaArrayType != 0){ | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |
| ... | |
| if( deblocking_filter_override_enabled_flag ) | |
| dbf_info_in_ph_flag | u(1) |

Table 6 shows an example embodiment according to an implementation applied to the VVC syntax where the ChromaArrayType syntax element is tested at the picture header level.

TABLE 6

| picture_header_structure( ) { | Descriptor |
|---|---|
| ... | |
| if( deblocking_filter_override_enabled_flag && dbf_info_in_ph_flag ) { | |
| ph_deblocking_filter_override_flag | u(1) |
| if( ph_deblocking_filter_override_flag ) { | |

TABLE 6-continued

| picture_header_structure( ) { | Descriptor |
|---|---|
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| if (ChromaArrayType != 0){ | |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |
| } | |
| ... | |

Table 7 shows an example embodiment according to an implementation applied to the VVC syntax where the ChromaArrayType syntax element is tested at the slice header level.

TABLE 7

| slice_header( ) { | Descriptor |
|---|---|
| ... | |
| if( deblocking_filter_override_enabled_flag && !dbf_info_in_ph_flag ) | |
| slice_deblocking_filter_override_flag | u(1) |
| if( slice_deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| if (ChromaArrayType != 0){ | |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| } | |
| ... | |

This mechanism simplifies the encoder design since when using a chroma format of yuv400 of yuv444 with separable color format, there is no more need to specify dummy values of parameters that will not be used. It also improves the efficiency of the coding since some bits are saved either at PPS, PH or SH level. This is particularly interesting when considering massive dataset or internet traffics.

In a second embodiment, it is proposed to reduce the interaction between SPS and PPS. Indeed, ChromaArrayType depends on the SPS syntax elements chroma_format_idc and separate_colour_plane_flag. Therefore, it might be preferable that this value is not used inside PPS. For this reason, the PPS flag of pps_chroma_tool_offsets_present_flag may be used. This flag is meant for enabling/disabling all chroma QP offset. In addition to the syntax elements illustrated in table 1, the picture parameter set also comprises the elements illustrated in table 8.

TABLE 8

| pic_parameter_set_rbsp( ) { | Descriptor |
|---|---|
| ... | |
| pps_chroma_tool_offsets_present_flag | u(1) |
| if( pps_chroma_tool_offsets_present_flag ) { | |
| pps_cb_qp_offset | se(v) |
| pps_cr_qp_offset | se(v) |

TABLE 8-continued

| pic_parameter_set_rbsp( ) { | Descriptor |
|---|---|
|     pps_joint_cbcr_qp_offset_present_flag | u(1) |
|     if( pps_joint_cbcr_qp_offset_present_flag ) | |
|         pps_joint_cbcr_qp_offset_value | se(v) |
|     pps_slice_chroma_qp_offsets_present_flag | u(1) |
|     pps_cu_chroma_qp_offset_list_enabled_flag | u(1) |
|   } | |
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } | |
|   } | |
|   ... | |

The semantic of these syntax elements is as follows:

pps_chroma_tool_offsets_present_flag equal to 1 specifies that chroma tool offsets related syntax elements are present in the PPS RBSP syntax structure.

pps_chroma_tool_offsets_present_flag equal to 0 specifies that chroma tool offsets related syntax elements are not present in in the PPS RBSP syntax structure.

when ChromaArrayType is equal to 0, the value of pps_chroma_tool_offsets_present_flag shall be equal to 0.

Therefore, in this second embodiment, the same flag is used to check if chroma components are available, as illustrated in table 9.

TABLE 9

| pic_parameter_set_rbsp( ) { | Descriptor |
|---|---|
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       if (pps_chroma_tool_offsets_present_flag { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
|   ... | |
|   if( deblocking_filter_override_enabled_flag ) | |
|     dbf_info_in_ph_flag | u(1) |

Editorially, it is proposed to change the name of the pps_chroma_tool_offsets_present_flag flag to pps_chroma_tool_offsets_dbf_present_flag. This is illustrated by the Table 9.1 below.

TABLE 9.1

| pic_parameter_set_rbsp( ) { | Descriptor |
|---|---|
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       if (pps_chroma_tool_offsets_dbf_present_flag { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
|   ... | |
|   if( deblocking_filter_override_enabled_flag ) | |
|     dbf_info_in_ph_flag | u(1) |

The semantic of this syntax element is as follows:

pps_chroma_tool_offsets_dbf_present_flag equal to 1 specifies that chroma tool offsets related syntax elements and chroma deblocking filter parameters are present in the PPS RBSP syntax structure.

pps_chroma_tool_offsets_dbp_present_flag equal to 0 specifies that chroma tool offsets related syntax elements and chroma deblocking filter parameters are not present in in the PPS RBSP syntax structure.

when ChromaArrayType is equal to 0, the value of pps_chroma_tool_offsets_dbf_present_flag shall be equal to 0.

In at least a variant embodiment, it is proposed to avoid any dependency of the PPS on the SPS and to decouple the control of the chroma QP offset tool and of the chroma deblocking filter parameters. This may be implemented by inserting a specific flag in the PPS, dedicated to signaling that chroma deblocking filter parameters are signaled in the considered PPS. This may take the form of the pps_chroma_deblocking_filter_parms_present_flag syntax element and the modified PPS syntax table illustrated in Table 10.

TABLE 10

| pic_parameter_set_rbsp( ) { | Descriptor |
|---|---|
|   ... | |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       pps_chroma_deblocking_filter_params_present_flag | u(1) |
|       if (pps_chroma_deblocking_filter_params_present_flag) { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
|   ... | |
|   if( deblocking_filter_override_enabled_flag ) | |
|     dbf_info_in_ph_flag | u(1) |

The advantage of this variant embodiment is that the signaling of the chroma deblocking filter parameters in the PPS is decoupled from the signaling of the chroma QP offset parameters, which may depend on the pps_chroma_tool_offsets_present_flag as specified in VVC draft 8 for example. The semantics of the new introduced PPS level flag syntax element is as follows:

pps_chroma_deblocking_filter_params_present_flag equal to 1 specifies that chroma decoded picture parameters are present in the PPS RBSP syntax structure.

pps_chroma_deblocking_params_present_flag equal to 0 specifies that chroma deblocking filter parameters are not present in in the PPS RBSP syntax structure.

when ChromaArrayType is equal to 0, the value of pps_chroma_deblocking_filter_params_present_flag shall be equal to 0.

In at least a variant embodiment, a PPS level flag indicating that chroma is available is introduced. It is for example named pps_chroma_available_flag, and somehow repeats the information that ChromaArrayType is different from 0 or not at PPS level. If this new flag is equal to zero or false, both chroma deblocking and chroma offset related flags shall be equal to zero. It is a requirement of bitstream conformance that the value pps_chroma_available_flag shall be zero when chromaArrayType is zero and the value pps_chroma_available_flag shall be one when chromaArrayType is one.

According to a first aspect of this embodiment, the chroma deblocking filter parameters shall not be present in the PPS, as illustrated in table 11. According to a further aspect, the PPS chroma QP offsets related syntax elements, starting with the pps_chroma_tool_offsets_present_flag, shall not be present in the PPS if the flag pps_chroma_available_flag is equal to zero or false.

TABLE 11

| pic_parameter_set_rbsp( ) { | Descriptor |
|---|---|
| ... | |
| pps_chroma_available_flag | u(1) |
| if( pps_chroma_available_flag ) { | |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp _offset_present_flag | u(1) |
|     if( pps_joint_cbcr qp_offset_present_flag ) | |
|       pps_joint_cbcr qp_offset_value | se(v) |
|     pps_slice_chroma_qp_offsets_present_flag | u(1) |
|     pps_cu_chroma_qp_offset_list_enabled_flag | u(1) |
|   } | |
| } | |
| ... | |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     if (pps_chroma_available_flag ) { | |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } | |
|   } | |
| } | |
| ... | |
| if( deblocking_filter_override_enabled_flag ) | |
|   dbf_info_in_ph_flag | u(1) |

According to a variant of this embodiment, the flag pps_chroma_deblocking_filter_params_present_flag shall be signaled as described in the previous embodiment of table 10 if the flag pps_chroma_abailable_flag is equal to 1 or true. Then the presence of chroma deblocking filtering parameters in the PPS shall depend on the value of the flag pps_chroma_deblocking_filter_params_present_flag. If not present in the bitstream, the flag pps_chroma_deblocking_filter_params_present_flag shall be inferred to 0.

TABLE 12

| pic_parameter_set_rbsp( ) { | Descriptor |
|---|---|
| ... | |
| pps_chroma_available_flag | u(1) |
| if( pps_chroma_available_flag ) { | |
|   pps_chroma_tool_offsets_present_flag | u(1) |
|   if( pps_chroma_tool_offsets_present_flag ) { | |
|     pps_cb_qp_offset | se(v) |
|     pps_cr_qp_offset | se(v) |
|     pps_joint_cbcr_qp _offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
|   } | |
| } | |
| ... | |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     if( pps_chroma_available_flag ) { | |
|       pps_chroma_deblocking_filter_params_present_flag | u(1) |
|       if (pps_chroma_deblocking_filter_params_present_flag) { | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
| } | |
| ... | |
| if( deblocking_filter_override_enabled_flag ) | |
|   dbf_info_in_ph_flag | u(1) |

Figure 5:
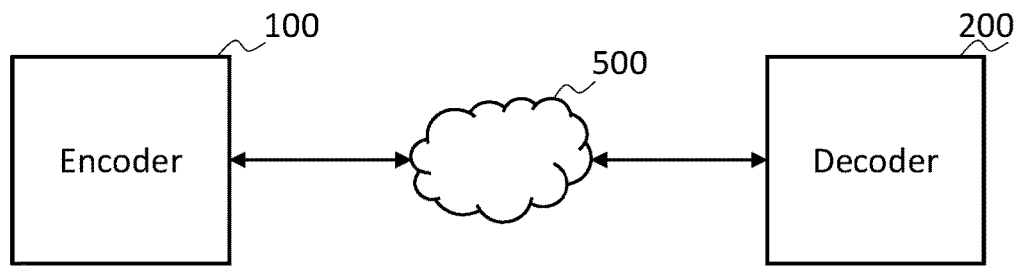
FIG. 5 shows a high-level representation of an end-to-end workflow supporting content delivery of encoded video in accordance with an example of the present principles.

FIG. 5 shows a high-level representation of an end-to-end workflow supporting content delivery of encoded video in accordance with an example of the present principles. The encoder device 100 is configured to implement a method for encoding an image or a video bitstream according to at least one embodiment described above and the decoder device 200 is configured to implement a method for decoding an image or video stream according to at least one embodiment described above. The two remote devices 100 and 200 are communicating over a distribution network 500 that is configured at least to provide the encoded image or video bitstream from device 100 to device 200.

Device 100 being configured to implement an encoding method belongs to a set of devices comprising a mobile device, a communication device, a game device, a tablet (or tablet computer), a computer device such as a laptop, a still image camera, a video camera, an encoding chip, a still image server and a video server (e.g. a broadcast server, a video-on-demand server or a web server).

Device 200 being configured to implement a decoding method as described herein belongs to a set of devices comprising a mobile device, a communication device, a game device, a set top box, a TV set (or television), a tablet (or tablet computer), a computer device such as a laptop, a display, a head-mounted display and a decoding chip.

In accordance with an example, the network is a broadcast network, adapted to broadcast still images or video images from device 100 to a plurality of decoding devices including the device 200. DVB and ATSC based networks are examples of such broadcast networks. In accordance with another example, the network is a broadband network adapted to deliver still images or video images from device 100 to a plurality of decoding devices including the device 200. Internet-based networks, GSM networks or TV over IP networks are examples of such broadband networks.

In the preferred embodiment, the end-to-end workflow uses a broadcast server for device 100, a television or set top box for device 200 and a DVB terrestrial broadcast network.

In an alternate embodiment, the distribution network NET is replaced by a physical packaged media on which the encoded image or video bitstream is stored. Physical package media comprise optical packaged media such a Blu-ray disc and UHD Blu-ray but also memory-based package media.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

- SDP (session description protocol), a format for describing multimedia communication sessions for the purposes of session announcement and session invitation, for example as described in RFCs and used in conjunction with RTP (Real-time Transport Protocol) transmission.
- MPEG DASH MPD (Dynamic Adaptive Streaming over HTTP, Media Presentation Description) Descriptors, for example as used in DASH and transmitted over HTTP, a Descriptor is associated to a Representation or collection of Representations to provide additional characteristic to the content Representation.
- RTP (Real-time Transport Protocol) header extensions, for example as used during RTP streaming.
- ISO Base Media File Format, for example as used in OMAF and using boxes which are object-oriented building blocks defined by a unique type identifier and length also known as 'atoms' in some specifications.
- HLS (HTTP Live Streaming) manifest transmitted over HTTP. A manifest can be associated, for example, to a version or collection of versions of a content to provide characteristics of the version or collection of versions.

Figure 6A:
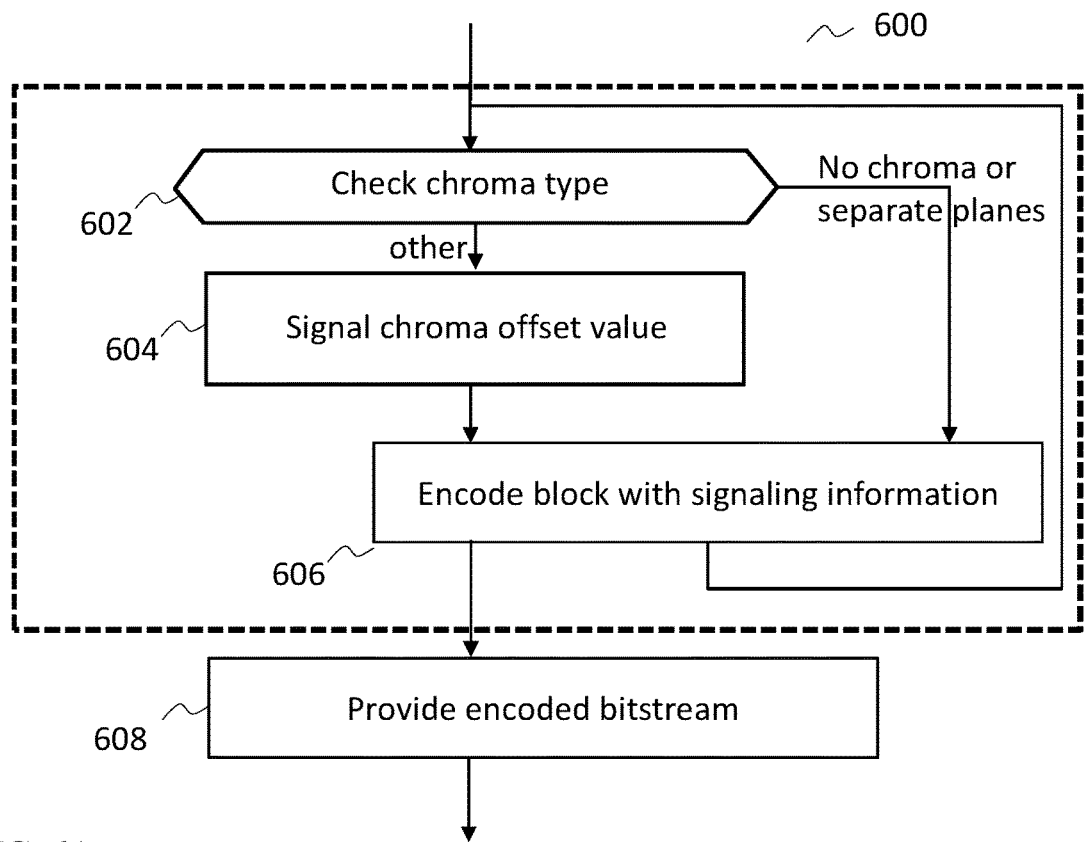
FIG. 6A illustrates an example of flowchart for encoding according to a second example embodiment.

FIG. 6A illustrates an example of flowchart for the encoding process according to the second example embodiment. More particularly, it represents an example flowchart for implementing the variant embodiment corresponding to Table 9 above. Such process 600 is for example implemented in the video encoder 100 described above. In this process, in step 602, the encoder checks the use of chroma and of separate colour planes. If chroma is used and is not using separate colour planes, in step 604, then chroma offset values are needed. This is to signaled by an appropriate flag (for example pps_chroma_tool_offsets_present_flag as in Table 9) and the chroma offset values are signaled for example by inserting the cb and cr offset related elements illustrated in Table 9. If it is not the case, in branch "No chroma or separate planes", then no additional signaling related to chroma offset values is signaled. Then the block is encoded, in step 608, with the appropriate signaling information. The process iterates over other blocks in step 602, 604 and 606 until providing the encoded bitstream in step 608. The person skilled in the art will acknowledge that the whole encoding process comprises other steps not represented here since not related to the embodiment.

Figure 6B:
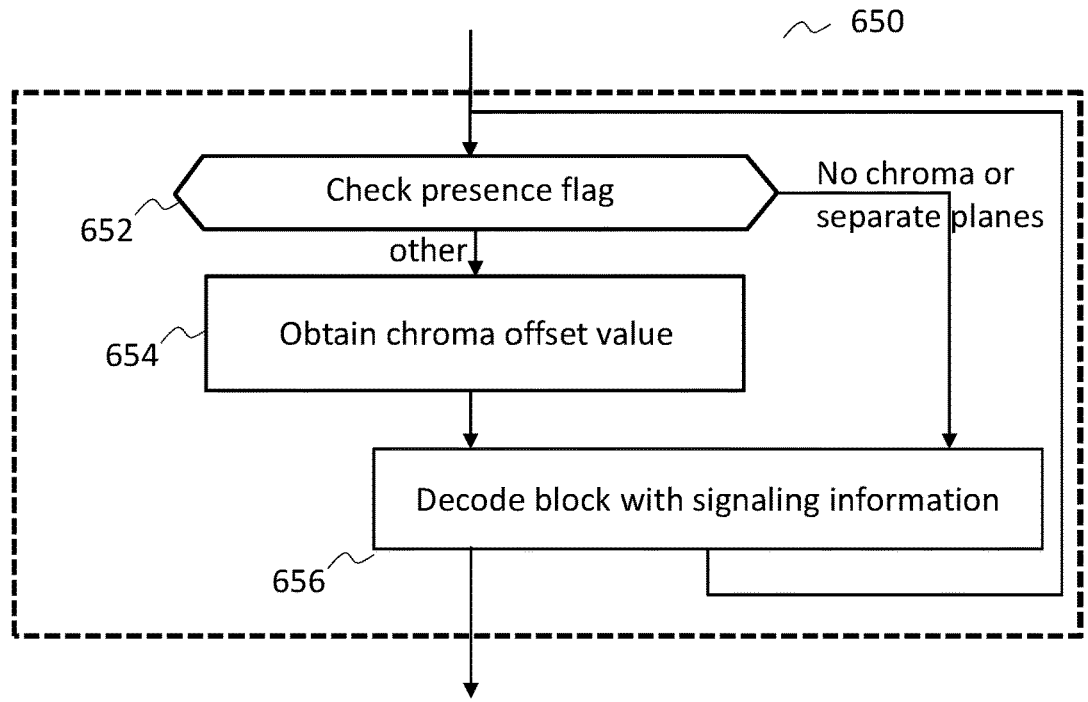
FIG. 6B illustrates an example of flowchart for decoding according to a second example embodiment.

FIG. 6B illustrates an example of flowchart for the decoding process according to the second example embodiment. More particularly, it represents an example flowchart for implementing the variant embodiment corresponding to Table 9 above. Such process 650 is for example implemented in the video decoder 200 described above. In this process, in step 652, the decoder checks a flag signaling the presence of the chroma offset values (for example pps_chroma_tool_offsets__present_flag as in Table 9). If it is the case, in step 654, then the chroma offset values are obtained, for example by parsing the subsequent elements such as illustrated in Table 9. If it is not the case, in branch "No chroma or separate planes", then no additional signaling related to chroma offset values is further obtained. Then the block is decoded, in step 656, based on the appropriate signaling information. The process iterates over other blocks in step 652, 654 and 656 until the bitstream has been processed. The person skilled in the art will acknowledge that the whole encoding process comprises other steps not represented here since not related to the embodiment.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment. Additionally, this application or its claims may refer to "determining" various pieces of information. Determining the information may include one or more of, for example, estimating the information, calculating the information, predicting the information, or retrieving the information from memory. Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information. Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information. Additionally, luma and luminance are used indifferently and should be understood has having the same meaning. Similarly, chroma and chrominance are used indifferently and should be understood has having the same meaning.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method comprising, for at least one block of at least one image of a video:
    encoding the block and corresponding signaling information, the signaling information comprising at least an information representative of a presence of chroma offset values, wherein:
        when chroma is present and separate color planes are not used, the information representative of the presence of chroma offset values is set to a first value and the signaling information further comprises information representative of the chroma offset values; and
        when chroma is not present or separate color planes are used, the information representative of the presence of chroma offset values is set to a second value and no information representative of chroma offset values is further signaled.

2. The method of claim 1, wherein the chroma offset values are parameters of a deblocking filter.

3. The method of claim 1, wherein the information representative of the presence of chroma offset values is signaled in a picture parameter set.

4. The method of claim 1, wherein the information representative of the presence of chroma offset values is signaled at a picture level.

5. A method comprising, for at least one block of at least one image of a video:
    obtaining signaling information comprising at least an information representative of a presence of chroma offset values;
    when the information representative of the presence of chroma offset values is set to a first value indicating that chroma is present and when separate color planes are not used, obtaining information representative of chroma offset values from the signaling information and decoding the at least one block based on the obtained signaling information and the chroma offset values; and
    when the information representative of the presence of chroma offset values is set to a second value indicating that chroma is not present or when separate color planes are used, decoding the at least one block based on the obtained signaling information without chroma offset values.

6. The method of claim 5, wherein the chroma offset values are parameters of a deblocking filter.

7. The method of claim 5, wherein the information representative of the presence of chroma offset values is signaled in a picture parameter set.

8. The method of claim 5, wherein the information representative of the presence of chroma offset values is signaled at a picture level.

9. An apparatus comprising:
    an encoder configured to, for at least one block of at least one image of a video, encode the at least one block and corresponding signaling information, the signaling information comprising at least an information representative of a presence of chroma offset values, wherein:
        when chroma is present and separate color planes are not used, the information representative of the presence of chroma offset values is set to a first value and the signaling information further comprises information representative of the chroma offset values; and
        when chroma is not present or separate color planes are used, the information representative of the presence of chroma offset values is set to a second value and no information representative of chroma offset values is further signaled.

10. The apparatus of claim 9, wherein the chroma offset values are parameters of a deblocking filter.

11. The apparatus of claim 9, wherein the information representative of the presence of chroma offset values is signaled in a picture parameter set.

12. An apparatus comprising:
    a decoder configured to, for at least one block of at least one image of a video:
        obtain signaling information comprising at least an information representative of a presence of chroma offset values;
        when the information representative of the presence of chroma offset values is set to a first value indicating that chroma is present and when separate color planes are not used, obtain information representative of chroma offset values from the signaling information and decode the at least one block based on the obtained signaling information and the chroma offset values; and
        when the information representative of the presence of chroma offset values is set to a second value indicating that chroma is not present or when separate color planes are used, decode the at least one block based on the obtained signaling information without chroma offset values.

13. The apparatus of claim 12, wherein the chroma offset values are parameters of a deblocking filter.

14. The apparatus of claim 12, wherein the information representative of the presence of chroma offset values is signaled in a picture parameter set.

15. The apparatus of claim 12, wherein the information representative of the presence of chroma offset values is signaled at a picture level.

16. The apparatus of claim 9, wherein the apparatus is a mobile device, a communication device, a game device, a tablet, a tablet computer, a computer device, a still image camera, a video camera, an encoding chip, a still image server, a video server, a broadcast server, a video-on-demand server, or a web server.

17. The apparatus of claim 12, wherein the apparatus is a mobile device, a communication device, a game device, a set top box, a TV set, a television, a tablet, a tablet computer, a computer device, a laptop, a display, a head-mounted display, or a decoding chip.

18. A non-transitory computer readable medium comprising program code instructions executable by a processor for implementing the steps of the method according to claim 1.

19. A non-transitory computer readable medium comprising program code instructions executable by a processor for implementing the steps of the method according to claim 5.

* * * * *